(12) United States Patent
Zhang et al.

(10) Patent No.: US 12,499,697 B2
(45) Date of Patent: Dec. 16, 2025

(54) TEXT IMAGE SUPER-RESOLUTION METHOD BASED ON TEXT ASSISTANCE

(71) Applicant: NANJING UNIVERSITY OF POSTS AND TELECOMMUNICATIONS, Nanjing (CN)

(72) Inventors: Dengyin Zhang, Nanjing (CN); Junhao Ying, Nanjing (CN); Weidan Yan, Nanjing (CN)

( * ) Notice: Subject to any disclaimer, the term of this patent is extended or adjusted under 35 U.S.C. 154(b) by 254 days.

(21) Appl. No.: 18/502,314

(22) Filed: Nov. 6, 2023

(65) Prior Publication Data

US 2024/0311963 A1 Sep. 19, 2024

Related U.S. Application Data

(63) Continuation of application No. PCT/CN2023/122653, filed on Sep. 28, 2023.

(30) Foreign Application Priority Data

Mar. 15, 2023 (CN) .......................... 202310244778.6

(51) Int. Cl.
*G06V 20/62* (2022.01)
*G06T 3/4053* (2024.01)
*G06V 10/77* (2022.01)
*G06V 10/82* (2022.01)

(52) U.S. Cl.
CPC ............ *G06V 20/62* (2022.01); *G06T 3/4053* (2013.01); *G06V 10/7715* (2022.01); *G06V 10/82* (2022.01)

(58) Field of Classification Search
CPC .... G06V 20/62; G06V 10/7715; G06V 10/82; G06T 3/4053
See application file for complete search history.

(56) References Cited

U.S. PATENT DOCUMENTS

2021/0073945 A1* 3/2021 Kim ...................... G06T 3/4053

OTHER PUBLICATIONS

Liu et al, "Text Image Super Resolution Using Deep Attention Neural Network" (published at 2021 IEEE 10th Global Conference on Consumer Electronics (GCCE), pp. 280-282, Oct. 2021).*

* cited by examiner

*Primary Examiner* — Casey L Kretzer

(57) ABSTRACT

The present application discloses a text image super-resolution method based on text assistance, including: obtaining a low-resolution text image to be reconstructed; inputting the low-resolution text image into a pre-trained text image super-resolution model, and determining a reconstructed text image based on an output of the text image super-resolution model; a method of constructing and training the text image super-resolution model includes: obtaining a text image dataset; and training the pre-constructed text image super-resolution model by using the text image dataset to obtain the trained text image super-resolution model. Compared to other ordinary super-resolution models, this text image super-resolution model fuses the text sequence features with the image texture features, and fully exploits and utilizes the text information in the low-resolution image, which can help to improve the quality of reconstructed text image.

9 Claims, 2 Drawing Sheets

TEXT IMAGE SUPER-RESOLUTION METHOD BASED ON TEXT ASSISTANCE

CROSS-REFERENCE TO RELATED APPLICATIONS

This application claims priority to Chinese Patent Application No. 202310244778.6, filed on Mar. 15, 2023, the entire disclosures of which are incorporated herein by reference.

TECHNICAL FIELD

The present application relates to a text image super-resolution method based on text assistance, and belongs to the technical field of image processing.

BACKGROUND

Image is an important carrier for carrying information, and image processing technology is a significant part of information processing technology. The resolution of images is a vital element of image processing. The resolution of images affects the difficulty of the visual task and the visual perception of human. High-resolution images can provide clearer details, which is convenient for analysis, decision, viewing and so on. However, acquiring high-resolution images often requires high-cost image acquisition device. Therefore a practical and effective method is the image super-resolution technology.

The image super-resolution (SR) is to reconstruct low-resolution (LR) images into high-resolution (HR) images through a certain algorithm. Image super-resolution reconstructs high-resolution images only through computer processing, reducing the additional cost of high-precision image acquisition device. Besides, the super-resolution technology can make up as much as possible for the degradation of image quality due to poor image information acquisition or compression of the transmission process. Therefore, the study of image super-resolution algorithms is of great significance.

Traditional image super-resolution algorithms can be divided into two categories: interpolation-based methods and reconstruction-based methods. With the booming development of deep learning in recent years, image super-resolution algorithms have also begun to be closely integrated with deep learning. The main idea of image super-resolution algorithms based on deep learning is to use high-resolution and low-resolution images to train deep models, to characterize the mapping relationship therebetween. The deep residual network is to extract features from the image through multiple residual modules, in which the skip connection is used to connect the network input to the network output to ensure the stability of the whole network, so that the whole model will be less difficult to converge during training.

The text recognition is one of the most basic and important computer vision tasks, at the same times, the text recognition provides the basis for subsequent text-related applications. Existing text recognizers have achieved satisfactory results on clear scene text images. However, when recognizing low-resolution text images, the recognition accuracy usually drops sharply.

SUMMARY

In order to overcome the deficiencies in the prior art, the present application provides a text image super-resolution method based on text assistance, which can use the super-resolution of a text image as a preprocessing work for text recognition, so as to improve the accuracy of text recognition.

In order to achieve the above purpose, the present application adopts the following technical solutions.

In a first aspect, the present application provides a text image super-resolution method based on text assistance, including:

obtaining a low-resolution text image to be reconstructed;

inputting the low-resolution text image into a pre-trained text image super-resolution model, and determining a reconstructed text image result based on an output of text image super-resolution model;

where a method of constructing and training the text image super-resolution model includes:

obtaining a text image dataset; and training the pre-constructed text image super-resolution model by using the text image dataset to obtain the trained text image super-resolution model.

In some embodiments, the inputting the low-resolution text image into the pre-trained text image super-resolution model, and determining the reconstructed text image result based on the output of the text image super-resolution model, includes:

taking a RGB image corresponding to the low-resolution text image and its binary mask image as a four channel input, and extracting shallow features through a convolutional layer with a convolutional kernel of 3*3 and a Relu activation layer to obtain a first feature map;

inputting the first feature map into a Convolutional Block Attention Module (CBAM) to obtain a feature map with channel and spatial attention;

extracting from the feature map with the attention weights through a plurality of Gated Text Detection Blocks (GTDBs) to obtain text sequence features;

adding the text sequence features output by GTDBs and the first feature map to obtain a new feature map; and inputting the new feature map into a sub-pixel convolutional upsampling layer and a Tanh activation layer to obtain an output reconstructed four-channel text image.

In some embodiments, a method of constructing the text image super-resolution model includes:

replacing residual blocks in a deep residual network with the GTDBs, and adding a CBAM before the GTDBs;

where a processing of the CBAM includes:

obtaining the channel and spatial attention weights of the image from the input first feature map along a channel dimension and a spatial dimension sequentially; and multiplying the channel and spatial attention weights of the image with the input first feature map to realize adaptive adjustment of the features, to obtain the feature map with the attention weights.

In some embodiments, the Gated Text Detection Blocks extract image features from the feature map sequentially through two convolutional layers with convolution kernels of 3*3 and Batch Normalization (BN) layers, and sequential features in the horizontal direction are captured by LSTM, and the sequential features in the vertical direction are obtained by transposing the feature map, and then the image features, the horizontal text features, and the vertical text features are fused through a gated unit, and the fused features are input to the next GTDB.

In some embodiments, a formula for the gated unit is:

$$F_g = \sum_{i=1}^{n}(W_i * F_i);$$

where n is a number of types of features, $W_i$ is a trainable weight, $F_i$ is an input feature, and $F_g$ is an output weighted feature.

In some embodiments, a loss function used in the text image super-resolution model for training is:

$$L = L_2 + \alpha L_{TA};$$

where $L_2$ is a mean square error loss function, $L_{TA}$ is a text-assisted loss function, and $\alpha$ is a hyperparameter of a ratio of two loss functions;

a formula for the mean square error loss function is:

$$L_2 = MSE(x, y) = \frac{1}{MN}\sum_{i=1}^{M}\sum_{j=1}^{N}(x_{ij} - y_{ij})^2;$$

where MSE is a mean square error, x, y are two images with a size of M×N, and $x_{ij}, y_{ij}$ is a value of a pixel point;

a formula for the text-assisted loss function is:

$$L_{TA} = \|\varphi(I^{HR}) - \varphi(I^{SR})\|_2;$$

where $I^{HR}$ is an original high-resolution text image, $I^{SR}$ is a network-generated super-resolution text image, $\varphi(I)$ is a one-dimensional vector generated by the image through a pre-trained text recognition network encoder, and $\|\cdot\|_2$ is taking 2-norm.

In some embodiments, during the training, the super-resolution image generated by the text image super-resolution model and a corresponding original high-resolution image are respectively inputted into the pre-trained text recognition network encoder to obtain corresponding one-dimensional recognition sequences, which can partly represent the text content in images.

In a second aspect, the present application provides a text image super-resolution device based on text assistance, comprising a processor and a storage medium;
where the storage medium is configured for storing instructions;
the processor is configured for operating according to the instructions to perform any one of the method in the first aspect.

In a third aspect, the present application provides a storage medium, on which a computer program is stored, wherein the computer program, when executed by the processor, implements any one of the method in the first aspect.

In a fourth aspect, the present application provides an apparatus, including:
one or more processors, one or more memories, and one or more programs;
where the one or more programs are stored in the one or more memories and configured to be executed by the one or more processors, the one or more programs comprising instructions for implementing any one of the methods in the first aspect. provided by the present application has the following advantages:

1. The text image super-resolution model disclosed in the present application introduces an attention module to assign different weights to the feature maps, which enables the super-resolution and the subsequent text detection to better focus on the text compared to other ordinary text image super-resolution models, thereby improving the quality of the model.
2. The text image super-resolution model disclosed in the present application fuses the text sequence features with the image texture features, which, compared to other ordinary super-resolution models, fully exploits and utilizes the text information in the low-resolution image, and helps to improve the quality of the text image.
3. In a further technical solution of the present application, a text-assisted loss is proposed, compared to the original loss function, the text-assisted loss reflects both the text content and the resolution of the text image, which helps to generate a more readable high-resolution text image.

DETAILED DESCRIPTION OF THE EMBODIMENTS

Figure 1:
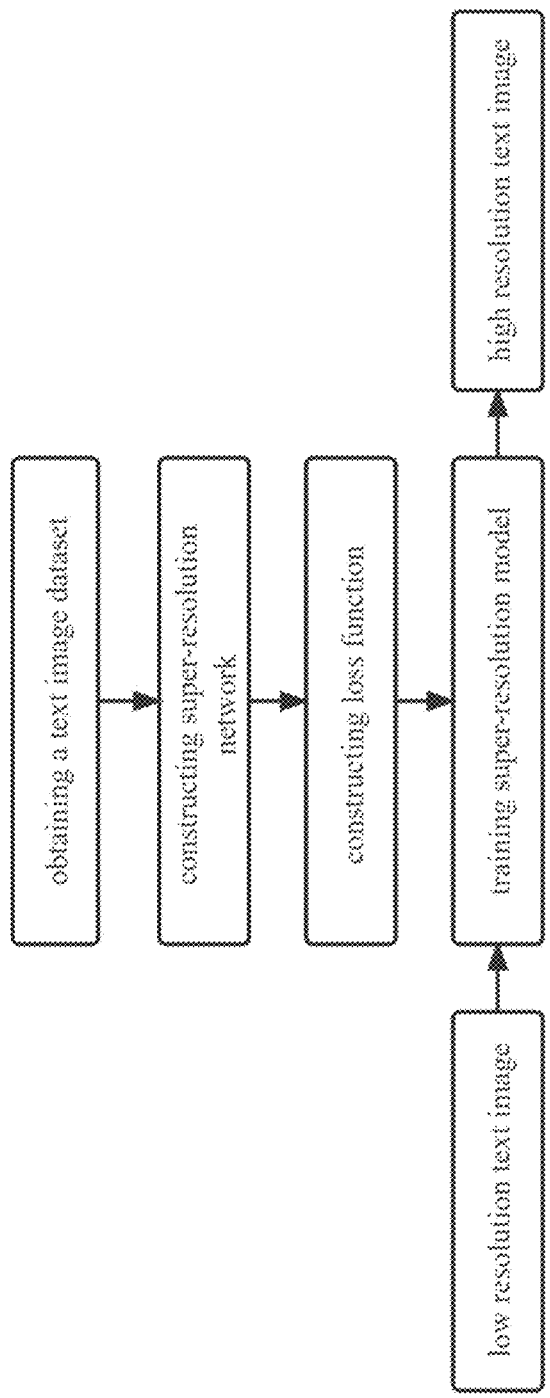
FIG. 1 is a flowchart of a text image super-resolution method based on text assistance according to an embodiment of the present application.

The present application is further described below in conjunction with the drawings and embodiments. The following embodiments are only used to more clearly illustrate the technical solution of the present application, and cannot be used to limit the scope of the present application.

In the description of the present application, a number means more than one, a plurality means more than two, greater than, less than, more than, etc. are understood to exclude the present number, and above, below, within, etc. are understood to include the present number. If there is a description such as the first, the second, it is only used for the purpose of distinguishing the technical features, and is not to be understood as indicating or implying relative importance or implicitly specifying the number of the indicated technical features or implicitly specifying the sequential relationship of the indicated technical features.

In the description of the present application, the terms "an embodiment", "some embodiments", "schematic embodiment", "example", "specific example", or "some examples" mean that the specific features, structures, materials, or characteristics described in connection with the embodiment or example are included in at least one embodiment or example of the present application. In this specification, schematic expressions of the above terms do not necessarily refer to the same embodiment or example. Moreover, the specific features, structures, materials, or characteristics described may be combined in any one or more embodiments or examples in a suitable manner.

Currently, deep learning-based image super-resolution has achieved more impressive performance, but most of these methods aim at recovering the detailed texture of natural images. In contrast, text image super-resolution tasks are more concerned with improving the readability of text while increasing image resolution. Performing super-resolution on a text image as if it is a natural image ignores the categorization information that comes from the text itself in the image. Therefore, compared to general image super-resolution algorithms, super-resolution of text images requires targeted algorithms to obtain satisfactory results.

The present application discloses a text image super-resolution method based on text assistance, which replaces the residual blocks with the gated text detection blocks proposed in the present application on the basis of a deep residual network (ResNet), utilizes a convolutional layer to extract features of the image, and then extracts sequence features through a bi-directional gated recurrent unit (GRU); and the gated unit is used to fuse the sequence features, and multiple gated text detection blocks are connected to extract deep features. On the other hand, the method adds a Convolutional Block Attention Module (CBAM) to the network, which further enhances the extraction of text sequence features by inputting features with channel and spatial attention weights to the Gated Text Detection Blocks. In addition, the method proposes a new loss function, called text-assisted loss, which takes into account the two objectives of image resolution and text readability to effectively enhance the performance of text image super-resolution model.

The First Embodiment

A text image super-resolution method based on text assistance, including:
  obtaining a low-resolution text image to be reconstructed;
  inputting the low-resolution text image into a pre-trained text image super-resolution model, and determining a text image super-resolution result based on an output of text image super-resolution model;
  where a method of constructing and training the text image super-resolution model includes:
  obtaining a text image dataset; and
  training the pre-constructed text image super-resolution model by using the text image dataset to obtain the trained text image super-resolution model.

Figure 2:
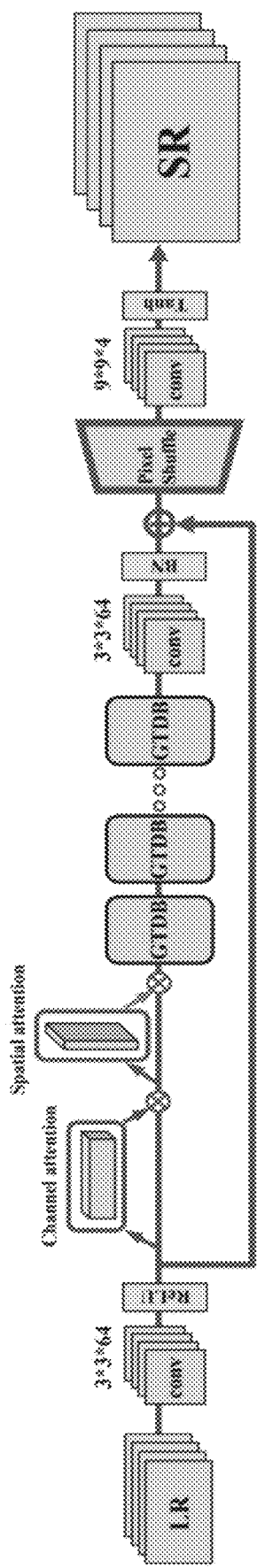
FIG. 2 is a schematic diagram of a text image super-resolution model network framework according to an embodiment of the present application.

In some embodiments, a text image super-resolution method based on text assistance is provided, as shown in FIG. 1, the method includes:
  S1, obtaining a text image dataset, the text image dataset in the embodiment is the Textzoom dataset.
  S2, dividing the dataset into a test set and a validation set, and inputting the test set and the validation set into the text image super-resolution model, and the model network framework is shown schematically in FIG. 2.

A RGB image corresponding to the low-resolution text image and its binary mask image are taken as four channel input, and shallow features are extracted through a convolutional layer with a convolutional kernel of 3*3 and a Relu activation layer to obtain the first feature map; the first feature map is input into a Convolutional Block Attention Module to obtain a feature map with channel and spatial attention weights; the feature map with the attention weights is extracted through a plurality of Gated Text Detection Blocks to obtain text sequence features; it performs concatenation on the text sequence features output by the Gated Text Detection Blocks and the first feature map and summing to obtain a new feature map; and the new feature map is input into a sub-pixel convolutional upsampling layer (pixel shuffle) and a Tanh activation layer to obtain the output reconstructed text image.

The Convolutional Block Attention Module extrapolates attention weights from the input feature map along a channel dimension and a spatial dimension sequentially; and multiplies the attention weights with the input feature map to realize adaptive adjustment of the features.

Figure 3:
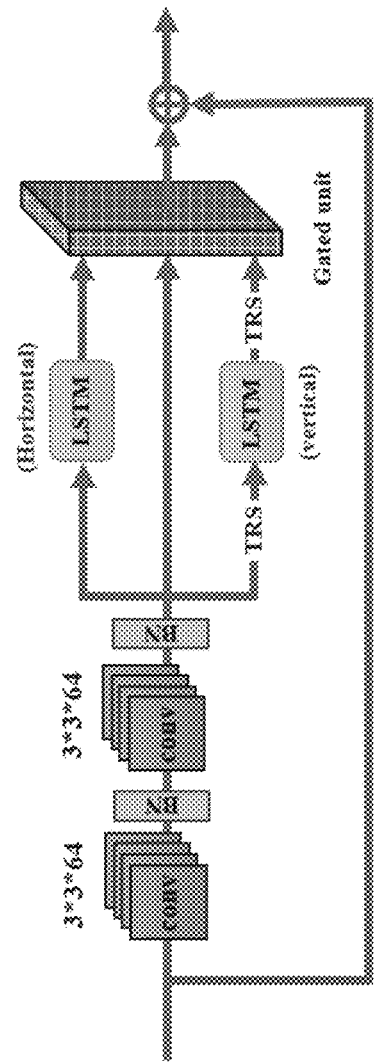
FIG. 3 is a schematic diagram of the Gated Text Detection Block according to an embodiment of the present application.

As shown in FIG. 3, the Gated Text Detection Block provided by the present embodiment extracts image features from the feature map sequentially through two convolutional layers with convolution kernels of 3*3 and Batch Normalization (BN) layers, and then sequential features in the horizontal direction are captured by LSTM. Likewise, the sequential features in the vertical direction are obtained by transposing the feature map. After that, the image features, the horizontal text features, and the vertical text features will be fused through a gated unit, and the fused features are input to the next Gated Text Detection Block.

a formula for the gated unit method is:

$$F_g = \sum_{i=1}^{n}(W_i * F_i);$$

where n is a number of types of features, $W_i$ is a trainable weight, $F_i$ is an input feature, and $F_g$ is an output weighted feature.

S3, constructing a loss function of a text image super-resolution network. The overall loss function of the network is:

$$L = L_2 + \alpha L_{TA};$$

where $L_2$ is a mean square error loss function, $L_{TA}$ is a text-assisted loss function, and $\alpha$ is a hyperparameter of a ratio of two loss functions.

The mean square error function is a loss function commonly used in the field of image processing, which is given as:

$$MSE(x, y) = \frac{1}{MN}\sum_{i=1}^{M}\sum_{j=1}^{N}(x_{ij} - y_{ij})^2;$$

where x, y are two images with a size of M×N, and $x_{ij}, y_{ij}$ is a value of a pixel point. A similarity of pixels of two images is measured by mean square error.

A formula for the text-assisted loss function provided in the present application is:

$$L_{TA} = \|\varphi(I^{HR}) - \varphi(I^{SR})\|_2;$$

where $I^{HR}$ is an original high-resolution text image, $I^{SR}$ is a network-generated super-resolution text image, $\varphi(I)$ is a one-dimensional vector generated by the image through a pre-trained text recognition network encoder.

The pre-trained region convolutional neural network (RCNN) text recognition network is selected for the text recognition network in the embodiment, and the super-resolution image generated by the network and the original high-resolution image are respectively inputted into the encoder of the RCNN model to obtain the corresponding one-dimensional recognition sequence. The similarity of the text content of the two images is measured by the similarity of the recognition sequences of the two text images.

S4: Training the text image super-resolution network includes:

S4.1: converting the low-resolution image into an RGB image and its binary mask image as a four channel input;

S4.2: inputting the four channel input obtained from S4.1 to the convolutional layer to extract shallow features, to obtain a feature map;

S4.3: inputting the feature map obtained from S4.2 to the convolutional block attention module to obtain the channel and spatial attention weights of the image;

S4.4: further extracting text sequence features from the feature map with attention weights obtained from S4.3 through a plurality of gated text detection blocks;

S4.5: adding the features outputted from S4.4 and the features outputted from S4.2 to obtain a new feature map;

S4.6: up-sampling the feature map obtained from S4.5 by sub-pixel convolution and outputting the super-resolution result by one convolutional layer;

S4.7: iterating the process from S4.1 to S4.6 to supervise network training by using loss function.

For the input low-resolution text image, the total error is derived by using forward propagation, then the partial derivatives of each weight parameter are derived by using backpropagation, and finally the weight parameters are updated according to the gradient descent method, which is iterated to save the weight parameters of the model with the smallest loss function to get the trained super-resolution network model.

S5: inputting the low-resolution text image to be processed into the text image super-resolution model to obtain a high-resolution text image.

This embodiment uses a piece of NVIDIA RTX 3090 GPU to complete the training of the model on a 64-bit Ubuntu 18.04.5 operating system based on the software environment of Python 3.6.9, torch 1.10.1, torch vision 0.11.2. The training process is performed by using the Adam optimizer with the learning rate 104, 500 training iterations and a total training time of about 40 hours.

The Second Embodiment

In the second embodiment, the present application provides a text image super-resolution device based on text assistance, which includes a processor and a storage medium; the storage medium is configured for storing instructions; the processor is configured for operating according to the instructions to perform the method according to the first embodiment.

The Third Embodiment

In the third aspect, the present application provides a storage medium, on which a computer program is stored, wherein the computer program, when executed by the processor, implements the method according to the first embodiment.

The Fourth Embodiment

In the fourth aspect, the present application provides an apparatus, includes: one or more processors, one or more memories, and one or more programs; where the one or more programs are stored in the one or more memories and configured to be executed by the one or more processors, the one or more programs including instructions for implementing the method according to any one of methods in the first embodiment.

It should be appreciated by those skilled in the art that embodiments of the present application may be provided as methods, systems, or computer program products. Accordingly, the present application may take the form of a fully hardware embodiment, a fully software embodiment, or an embodiment that combines software and hardware aspects. Further, the present application may take the form of a computer program product implemented on one or more computer-usable storage media (including, but not limited to, disk memory, CD-ROM, optical memory, and the like) that contain computer-usable program code therein.

The present application is described with reference to flowcharts and/or block diagrams of methods, devices (systems), and computer program products according to embodiments of the present application. It should be understood that each of the processes and/or boxes in the flowchart and/or the block diagram, and the combination of processes and/or boxes in the flowchart and/or the block diagram, may be implemented by computer program instructions. These computer program instructions may be provided to a processor of a general-purpose computer, a special-purpose computer, an embedded processor, or other programmable data-processing device to produce a machine, such that the instructions executed by the processor of the computer or other programmable data-processing device produce a device for carrying out the functions specified in the one process or multiple processes of the flowchart and/or the one box or multiple boxes of the box diagram.

These computer program instructions may also be stored in computer-readable memory capable of directing the computer or other programmable data processing device to operate in a particular manner, such that the instructions stored in the computer-readable memory produce an article of manufacture comprising an instruction device that implements the function specified in the flowchart one process or a plurality of processes and/or the box diagram one box or a plurality of boxes.

These computer program instructions may also be loaded onto a computer or other programmable data processing device, such that a series of operational steps are performed on the computer or other programmable device to produce computer-implemented processing, such that the instructions executed on the computer or other programmable device provide steps for implementing the functionality specified in one process or a plurality of processes and/or the box diagram one box or a plurality of boxes in the flowchart.

The foregoing is only a preferred embodiment of the present application, and it should be noted that for those skilled in the art, without departing from the principles of the present application, a number of improvements and embellishments may be made, which shall also be considered as the scope of the present application.

What is claimed is:

1. A text image super-resolution method based on text assistance, comprising:
  obtaining a low-resolution text image to be reconstructed;
  inputting the low-resolution text image into a trained text image super-resolution model, and determining a reconstructed text image result based on an output of the trained text image super-resolution model;

wherein a method of constructing and training a text image super-resolution model comprises:
obtaining a text image dataset; and
training the text image super-resolution model by using the text image dataset to obtain the trained text image super-resolution model;
wherein the inputting the low-resolution text image into the trained text image super-resolution model, and determining the reconstructed text image result based on the output of the trained text image super-resolution model, comprises:
taking a RGB image corresponding to the low-resolution text image and a binary mask image of the low-resolution text image as a four channel input, and extracting shallow features through a convolutional layer with a convolutional kernel of 3*3 and a Relu activation layer to obtain a first feature map;
inputting the first feature map into a Convolutional Block Attention Module (CBAM) to obtain a channel and spatial attention weights of the first feature map, to obtain a feature map with attention weights and a feature map with channel and spatial attention;
extracting from the feature map with the attention weights through a plurality of gated Gated Text Detection Blocks (GTDBs) to obtain text sequence features;
adding the text sequence features output by the plurality of GTDBs and the first feature map to obtain a new feature map; and
inputting the new feature map into a sub-pixel convolutional upsampling layer and a Tanh activation layer to obtain an output reconstructed four-channel text image.

2. The text image super-resolution method based on text assistance according to claim 1, wherein a method of constructing the text image super-resolution model comprises:
replacing residual module blocks in a deep residual network with the plurality of GTDBs, and adding the CBAM before the plurality of GTDBs;
wherein a processing of the CBAM comprises:
obtaining the channel and spatial attention weights of the image from the input first feature map along a channel dimension and a spatial dimension sequentially; and
multiplying the channel and spatial attention weights of the image with the input first feature map to realize adaptive adjustment of the features, to obtain the feature map with the attention weights.

3. The text image super-resolution method based on text assistance according to claim 1, wherein the plurality of GTDBs extracts image features from the feature map sequentially through two convolutional layers with convolution kernels of 3*3 and Batch Normalization (BN) layers, and then sequential features in the horizontal direction are captured by a Long Short-Term Memory (LSTM);
the sequential features in the vertical direction are obtained by transposing the feature map;
the image features, the horizontal text features, and the vertical text features are fused through a gated unit, and the fused features are input to a next GTDB.

4. The text image super-resolution method based on text assistance according to claim 3, wherein a formula for a gated unit method is:

$$F_g = \sum_{i=1}^{n}(W_i * F_i);$$

wherein n is a number of types of features, $W_i$ is a trainable weight, $F_i$ is an input feature, and $F_g$ is an output weighted feature.

5. The text image super-resolution method based on text assistance according to claim 1, wherein a loss function used in training the text image super-resolution model is:

$$L = L_2 + \alpha L_{TA};$$

wherein $L_2$ is a mean square error loss function, $L_{TA}$ is a text-assisted loss function, and $\alpha$ is a hyperparameter of a ratio of two loss functions;
a formula for the mean square error loss function is:

$$L_2 = MSE(x, y) = \frac{1}{MN}\sum_{i=1}^{M}\sum_{j=1}^{N}(x_{ij} - y_{ij})^2;$$

where MSE is a mean square error, x, y are two images with a size of M×N, and $x_{ij}, y_{ij}$ is a value of a pixel point;
a formula for the text-assisted loss function is:

$$L_{TA} = \|\varphi(I^{HR}) - \varphi(I^{SR})\|_2;$$

wherein $I^{HR}$ is an original high-resolution text image, $I^{SR}$ is a network-generated super-resolution text image, $\varphi(I)$ is a one-dimensional vector generated by the image through a pre-trained text recognition network encoder, and $\|\cdot\|_2$ is taking 2-norm.

6. The text image super-resolution method based on text assistance according to claim 5, wherein, during the training, the super-resolution image generated by the text image super-resolution model and a corresponding original high-resolution image are respectively inputted into the pre-trained text recognition network encoder to obtain corresponding one-dimensional recognition sequences, which partly represent the text content in images.

7. A text image super-resolution device based on text assistance, comprising a processor and a storage medium;
wherein the storage medium is configured for storing instructions;
the processor is configured for operating according to the instructions to perform the method according to claim 1.

8. A non-transitory storage medium, on which a computer program is stored, wherein the computer program, when executed by a processor, implements the method according to claim 1.

9. An apparatus, comprising:
one or more processors, one or more memories, and one or more programs;
wherein the one or more programs are stored in the one or more memories and configured to be executed by the one or more processors, the one or more programs comprising instructions for implementing the method according to claim 1.

* * * * *